3,058,919
DISPERSING AND DEMULSIFYING COMPOSITIONS

Walter Hagge and Josef Düsing, Leverkusen, and Joachim Kolbe, Opladen, Germany, assignors to Farbenfabriken Bayer Aktiengesellschaft, Leverkusen, Germany, a corporation of Germany
No Drawing. Filed Apr. 16, 1958, Ser. No. 728,793
Claims priority, application Germany Apr. 18, 1957
5 Claims. (Cl. 252—336)

The present invention relates to dispersing and demulsifying compositions; more particularly it concerns compositions consisting essentially of the following three components:

A. Water-soluble aliphatic sulfo compounds,
B. Barely water-soluble reaction products of water-soluble aliphatic sulfo compounds with amines, and
C. Barely water-soluble oxalkylation products of water-insoluble high molecular weight substances containing cyclic groups.

As water-soluble aliphatic sulfo compounds there may be considered for example sulfonation products of high molecular weight aliphatic hydrocarbons or of mixtures of mineral oil and naphthenic acids, succinic acid derivatives containing sulfo groups such as dioctyl sulfosuccinic acid esters or dioctyl succinic acid ester β-aminoethane sulfonic acid and also the sulfosuccinic acid ester amides described in French patent specification No. 1,091,997, in the form of their water-soluble salts, for example their sodium salts.

Barely water-soluble reaction products of water-soluble aliphatic sulfo compounds with amines are in the first place reaction products of water-soluble aliphatic sulfo compounds of the aforesaid type with primary, secondary or tertiary cycloaliphatic amines.

As barely water-soluble oxalkylation products of water-insoluble high molecular weight substances containing cyclic groups there are to be understood for example products obtainable by the action of ethylene oxide and/or propylene oxide on colophony or copals, on condensation products of phenolic compounds with aldehydes, or on cyclohexanols substituted by cyclic radicals (cf. inter alia German patent specifications Nos. 634,003 and 741,305).

Suitable proportions of the components listed above under A, B and C may easily be ascertained in each case by preliminary tests.

The compositions of the present invention are soluble in hydrocarbons, mineral oils and also in phenols; the water-solubility depends particularly on the ratio of the components A and B to the component C.

The proposed dispersing or demulsifying compositions can be applied in a manner known as such. When used as dispersing agents, the compositions are expediently employed as such or in the form of solutions or suspensions in water or alcohols such as isopropanol, butanol or cyclohexanol, and when used as demulsifying agents, for example for the separation of water, salts or other components from colloidal systems, they are also preferably employed as such or in the form of solutions or suspensions in water or in solvent mixtures containing low molecular weight alcohols, aliphatic hydrocarbons or phenols, for example cresols and xylenols.

If desired, the compositions of the present invention may also contain fatty acids such as stearic, oleic or linoleic acid or their anhydrides, or natural or synthetic fats, oils or waxes, for example linseed oil, wool fat, turpentine oil, castor oil or mineral oils. Quaternary compounds, chiefly those obtainable by the action of dimethyl sulfate or benzyl chloride on aliphatic amines containing at least 4 carbon atoms, or their reaction products with alkylene oxides may also be added to the compositions. If desired, the solubility of the compositions in the media applied may be further improved by the addition of cycloaliphatic or aromatic amines or their reaction products with ethylene oxide; for this purpose there may be used for instance cyclohexyl amine, dimethyl cyclohexyl amine, methyl or dimethyl naphthyl amine or cyclohexyl amine polyglycol ethers, further cyclohexene derivatives or their derivatives such as α- or β-terpineol, borneol, isoborneol, camphor or terpineol-polyglycol ether.

The proposed compositions allow to distribute very finely a great variety of inorganic substances insoluble or only barely soluble in water or other liquid media, such as carbon black, pigments, textile auxiliaries, pest control agents as well as active substances of the class of vitamins or hormones; with the aid of these mixtures it is also possible to break emulsions such as are formed for example in the production of antibiotics or of petroleum or in the working up of mineral oils. The proposed compositions may also be used with advantage as dispersing agents in emulsion polymerization. Compared with known dispersing or demulsifying agents, the compositions of the present invention are distinguished by an especial efficacy.

The following examples serve to illustrate the invention without, however, limiting the scope thereof; the parts given are by weight.

EXAMPLE 1

70 parts of titanium dioxide are kneaded with 30 parts of a composition consisting of 27 parts of the sodium salt of dioctyl sulfosuccinic acid ester, 53 parts of the cyclohexyl amine salt of this sulfosuccinic acid ester and 20 parts of an oxalkylation product obtainable according to German Patent No. 634,003 by reacting a condensation product of nonylphenol and formaldehyde of molecular weight 1750 with propylene oxide and ethylene oxide, the proportion by weight being 5:7:6. Sufficient water is added to form a plastic mass. The mixture thus obtained yields on stirring with water a very fine stable dispersion of the titanium dioxide.

EXAMPLE 2

A mixture of 40 parts of sulphonated olive oil, 45 parts of paraffin oil and 10 parts of an ester of tallow fatty acids, which mixture is intended for softening synthetic fibres, is intimately stirred with 5 parts of a composition consisting of 60 parts of the sodium salt of dioctyl sulfosuccinic acid ester, 30 parts of the cyclohexylamine salt of this sulfo-succinic acid ester and 10 parts of the oxalkylation product mentioned in Example 1. The mixture thus obtained yields, when diluted with water in a ratio of 1:100, an extremely fine and stable emulsion. The affinity of the softening mixture for the synthetic fibres is thus essentially improved and its penetration power into the fibres is increased.

EXAMPLE 3

10,000 parts of crude mineral oil having a content of 9.35 percent of water and 1.44 percent of common salt are heated to 60° C. for 30 minutes and then shaken for 1 minute with 400 parts of an aqueous solution containing 2 parts of a composition consisting of 47 parts of the sodium salt of the sulfosuccinic acid ester amide of Example 1 of French patent specification No. 1,091,997, 23 parts of the cyclohexylamine salt of this sulfosuccinic acid ester amide and 30 parts of the oxalkylation product mentioned in Example 1. The mixture is allowed to stand at 80–85° C. for 3 hours. The oil then separated shows a water content of only 0.03 percent and a salt content of only 0.012 percent.

EXAMPLE 4

A composition consisting of 28 parts of the sodium salt of the sulfosuccinic acid ester amide of Example 3, 42 parts of the cyclohexyl amine salt of this sulfosuccinic acid ester amide and 30 parts of the oxalkylation product obtainable according to German Patent No. 634,003 by reacting a condensation product of nonylphenol and formaldehyde of molecular weight 2400 with propylene oxide and ethylene oxide, the proportions by weight being 20:8:15, is treated with an equal amount of a mixture of petroleum, solvent naphtha and crude cresol, then intimately stirred with crude oil containing 12 percent of water in a ratio of 1:30000 and allowed to stand at ambient temperature for 5–8 hours. The water content of the separated oil is then only 0.02 percent.

EXAMPLE 5

A standard solution of a penicillin culture is treated in a ratio of 10,000:1 with a composition consisting of 40 parts of the sodium salt of dioctyl sulfosuccinic acid ester, 50 parts of the cyclohexyl amine salt of this sulfosuccinic acid ester and 10 parts of the oxalkylation product mentioned in Example 1. 1 part of glacial acetic acid is also added. The mixture is intimately stirred and then extracted with amylacetate. By subsequently centrifuging, the amylacetate solution containing penicillin is separated at one from the aqueous phase; this effect cannot be achieved without the addition of the composition.

EXAMPLE 6

A mixture of 40 parts of butadiene, 40 parts of acrylonitrile and 20 parts of styrene is emulsified in 150 parts of an aqueous solution containing 4 parts of a composition consisting of 60 parts of the sodium salt of dioctyl sulfosuccinic acid ester, 20 parts of the cyclohexyl amine salt of this sulfosuccinic acid ester and 20 parts of the oxalkylation product mentioned in Example 1. Moreover, there are added to the polymerisation mixture 0.5 part of a quaternary amine-polyglycol ether obtained by reacting dodecylamine with ethylene oxide in a molecular ratio of 1:10 and subsequently treating the reaction product with benzyl chloride. By the addition of 0.2 part of the sodium salt of the sulfinic acid of long-chain paraffins and of 2 parts of 1 N sulphuric acid, the polymerisation is activated and completed at 15–20° C. within 30 hours. The latex thus obtained yields upon pouring onto glass a film which neither yellows upon drying at 100° C. nor upon exposure to light. The polymerisation product precipitated by the addition of an electrolyte and washed and dried in usual manner can be pressed after the addition of plasticisers without stabilisation being required.

The high surface activity shown by the compositions of the present invention is very surprising. This is illustrated in greater detail in the following tables by comparing the wetting effect of compositions according to the invention at a concentration of 1.5 grams per litre, on the one hand, and of their individual components at concentrations of 1.5–0.68 grams per litre, on the other hand.

*Table Ia*

|   | Ratio of the components in the compositions A B C | Wetting time in seconds, ascertained by the submersion method |
|---|---|---|
| (1) | 60:30:10 | 2.0 |
| (2) | 60:20:20 | 2.6 |
| (3) | 45:45:10 | 2.2 |
| (4) | 40:50:10 | 2.8 |
| (5) | 40:40:20 | 3.1 |
| (6) | 30:60:10 | 4.6 |
| (7) | 30:40:30 | 5.1 |

*Table Ib*

| Components alone | Wetting time in seconds, ascertained by the submersion method at— | | |
|---|---|---|---|
|  | 1.2 g./l. | 1 g./l. | 0.68 g./l. |
| A | 1.2 | 2.9 | 7.4 |
| B | 144 |  |  |
| C | >3,600 |  |  |

In the Tables Ia and Ib:

A denotes the sodium salt of dioctyl-sulfosuccinic acid ester,

B the cyclohexyl-amine salt of dioctyl-sulfosuccinic acid ester,

C the oxalkylation product obtainable according to German Patent No. 634,003 by reacting a condensation product from nonylphenol and formaldehyde of molecular weight 1750 with propylene oxide and ethylene oxide in a proportion by weight of 5:7:6.

The following can for example be deduced therefrom: The wetting time of the composition listed in Table Ia under (3) is 2.2 seconds at a concentration of 1.5 grams per litre; 1.5 grams of this composition contain 0.68 gram of component A, and this component alone shows a wetting time of 7.4 seconds at a concentration of 0.68 gram per litre.

*Table IIa*

|   | Ratio of the components in the composition A B C | Wetting time in seconds, ascertained by the submersion method |
|---|---|---|
| (1) | 60:30:10 | 3.6 |
| (2) | 60:20:20 | 3.9 |
| (3) | 45:45:10 | 4.5 |
| (4) | 40:50:10 | 5.6 |
| (5) | 40:40:20 | 5.6 |
| (6) | 30:60:10 | 8.1 |
| (7) | 30:40:30 | 9.0 |

*Table IIb*

| Components alone | Wetting time in seconds, ascertained by the submersion method | | |
|---|---|---|---|
|  | 1.5 g./l. | 1.0 g./l. | 0.68 g./l. |
| A | 2.8 | 6.3 | 10.5 |
| B | 144 |  |  |
| C | >3,600 |  |  |

In the Tables IIa and IIb:

A denotes the sodium salt of the sulfosuccinic acid ester amide of Example 1 of French patent specification No. 1,091,997, B the cyclohexyl amine salt of the sulfosuccinic acid ester amide of Example 1 of French Patent Specification No. 1,091,997, C the oxalkylation product obtainable according to German Patent No. 634,003 by reacting a condensation product of nonylphenol and formaldehyde of molecular weight 1750 with propylene oxide and ethylene oxide in a proportion by weight of 5:7:6.

From the above, the following can, for example, be deduced: the wetting time of the composition listed in Table IIa under (3) is 4.5 seconds at a concentration of 1.5 grams per litre; 1.5 grams of this composition contain 0.68 gram of component A, and this component alone shows a wetting time of 10.5 seconds at a concentration of 0.68 gram per litre.

As can further be seen from Tables I*a* and II*a*, the compositions of the components A, B and C show an unexpectedly high surface activity, even in the presence of relatively large amounts of the non-wetting components B and C. It should, moreover, be mentioned that the components B and C which themselves are barely water-soluble, completely dissolve in water in the presence of component A in the indicated proportions of the mixture.

We claim:

1. A dispersing and demulsifying composition consisting essentially of (*a*) at least 20% by weight of a water-soluble salt selected from the group consisting of dioctyl sulfosuccinate, the sulfonation product of a high molecular weight aliphatic hydrocarbon, the sulfonation product of a mixture of mineral oil and a naphthenic acid, dioctyl succinic acid ester β-amionethane sulfonic acid, and sulfosuccinic acid ester amides; (*b*) at least 20% by weight of a salt of a water-soluble aliphatic compound containing sulfonic acid groups with a member selected from the group consisting of primary, secondary and tertiary cycloaliphatic amines; and (*c*) at least 10% by weight of an oxalkylation product prepared by reacting a member selected from the group consisting of ethylene oxide, propylene oxide, and mixtures thereof with a member selected from the group consisting of colophony, copal, phenol-aldehyde resins, and cyclohexanols substituted by cyclic radicals.

2. The composition of claim 1 wherein the water-soluble salts of component (*a*) are in the form of alkali salts.

3. The composition of claim 1 wherein component (*b*) is a salt of a member of the group consisting of primary, secondary, and tertiary cycloaliphatic amines with a member selected from the group consisting of dioctyl sulfosuccinate, the sulfonation product of a high molecular weight aliphatic hydrocarbon, the sulfonation product of a mixture of mineral oil and naphthenic acid, dioctyl succinic acid ester β-aminoethane sulfonic acid, and sulfosuccinic acid ester amides.

4. The composition of claim 1 wherein component (*c*) is prepared by reacting a member of the group consisting of colophony, copal, phenol-aldehyde resins, and cyclohexanols substituted by cyclic radicals first with propylene oxide and then with ethylene oxide, said component containing a plurality of propylene-O- and ethylene-O-groups.

5. A method for demulsifying crude mineral oil which comprises intimately mixing the crude mineral oil with the composition of claim 1.

References Cited in the file of this patent

UNITED STATES PATENTS

| | | |
|---|---|---|
| 1,860,563 | Wayne | May 31, 1932 |
| 2,072,085 | De Groote et al. | Mar. 2, 1937 |
| 2,342,150 | Kleinecke | Feb. 22, 1944 |
| 2,435,810 | Vitalis | Feb. 10, 1948 |
| 2,471,945 | Figdor | May 31, 1949 |
| 2,499,366 | De Groote et al. | Mar. 7, 1950 |
| 2,589,197 | Monson | Mar. 11, 1952 |
| 2,626,902 | De Groote | Jan. 27, 1953 |
| 2,828,268 | Stanger et al. | Mar. 25, 1958 |